United States Patent Office 2,924,560
Patented Feb. 9, 1960

2,924,560

METHOD OF MAKING TRICHLOROMETHYL-PHOSPHONIC DICHLORIDE

Thornton P. Traise and Edward N. Walsh, Chicago Heights, Ill., assignors to Victor Chemical Works, Chicago Heights, Ill., a corporation of Illinois No Drawing. Application June 13, 1957
Serial No. 665,602

11 Claims. (Cl. 204—158)

This invention relates to a new method of preparing trichloromethylphosphonic dichloride; more specifically, it relates to an improved catalytic method of preparing trichloromethylphosphonic dichloride from monochloromethylphosphonic dichloride.

Trichloromethylphosphonic dichloride, hereinafter referred to as TCMPD, is a known compound. In the past, however, it has generally been prepared by a tedious process involving the use of a Friedel-Crafts catalyst and the subsequent destruction of the intermediate complex which is formed. This type of reaction may be represented by the following equations:

(1) $PCl_3 + CCl_4 + AlCl_3 \rightarrow CCl_3PCl_3 \cdot AlCl_4$ (2) $CCl_3PCl_3 \cdot AlCl_4 + 7H_2O \rightarrow CCl_3POCl_2 + AlCl_3 \cdot 6H_2O + 2HCl$ It is evident from the above equations that this process involves the use of relatively expensive starting materials, requires a two-step process, and poses a difficult problem in the separation of the three end products. By the process of the present invention all of these difficulties are avoided.

The present invention relates to a simple one-step catalytic process for producing TCMPD comprising chlorinating monochloromethylphosphonic dichloride.

The process of this invention is best illustrated by the following equation:

$ClCH_2POCl_2 + 2Cl_2 \rightarrow Cl_3CPOCl_2 + 2HCl$

This one-step reaction is superior to the processes presently used to produce TCMPD. The reactants used in the process of this invention are relatively inexpensive and easily obtainable. In addition, the product produced by the process of this invention is of sufficient purity that it may be hydrolyzed directly to trichloromethylphosphonic acid without necessitating a distillation step to purify the acid chloride.

The monochloromethylphosphonic dichloride may be made by the known process of reacting phosphorus trichloride and formaldehyde under suitable conditions of temperature and pressure. This reaction may be expressed by the following equation:

$PCl_3 + HCHO \rightarrow ClCH_2POCl_2$

Ordinary commercial monochloromethylphosphonic dichloride having an index of refraction of approximately $n_D^{25} = 1.4966$ is suitable for this reaction.

Actinic light is the catalyst needed to make our reaction proceed. In some cases, for example, when ordinary white light, which is deficient in certain wave lengths, is used as the primary catalyst, it is desirable to use a strong acid catalyst in conjunction with the light; thus, the use of such ordinary white light and acid catalyst provides the advantage that when a ultraviolet light source is unavailable or economically impractical, ordinary white light may be used.

Among the strong acids which have been satisfactory catalysts for this invention are phosphorus trichloride, phosphorus pentachloride, phosphorus tribromide, phosphorus oxychloride, arsenic trichloride, antimony trichloride, benzene phosphorus dichloride, monochloromethylphosphonic acid, monochloromethylphosphonic tetrachloride, trifluoroacetic acid, trichloromethylphosphonic acid and similar compounds. It appears that any strongly acidic compound will work in this reaction, but trichloromethylphosphonic acid is especially preferred since it obviates the introduction of impurities.

The light which is used to catalyze this reaction may be referred to generally as actinic light. This classification includes the green, blue, and ultraviolet portions of the spectrum. Both ultraviolet light and white light from an ordinary household electric light bulb have been used satisfactorily. However, when white light is used, the purity of trichloromethylphosphonic dichloride is higher if one of the strong acids, such as shown above, is used as an additional catalyst.

The following examples illustrate the method of this invention.

Example I 500 gms. of chloromethylphosphonic dichloride and 5 gms. of $PCl_5$ were placed in a one-liter flask equipped with a thermometer, gas inlet tube, and reflux condenser. The reflux condenser was in turn connected to a trap cooled with Dry Ice and, then, to an HCl-absorber containing water. A 150-watt light bulb was placed beneath the flask to provide heat and actinic light as a catalyst. Chlorine gas was then admitted slowly and the reaction appeared to begin after about twenty minutes at a temperature of 70°–75° C. Chlorination was continued for a total of 21 hours while keeping the temperature above 100° C. After the chlorination was stopped the solid product was distilled directly out of the reaction flask using a 12" Vigreux column. 550.4 gms. of trichloromethylphosphonic dichloride were recovered in the fraction distilling at a vapor temperature of 199°–200° C. at atmospheric pressure. This product, which represents an 80.9% yield, was a white solid with a melting point of 154°–156° C. It analyzed as follows:

|  | Theory | Analysis |
|---|---|---|
| Percent P | 13.1 | 12.9 |
| Percent Chlorine | 75.0 | 74.5 |
| Percent Chloride (ionic) | 30.0 | 29.8 |

Example II

Using equipment similar to that used in Example I, 479.8 gms. of chloromethylphosphonic dichloride and 4.8 gms. of antimony trichloride were placed in the reaction flask. The 150-watt light bulb was lit and the chlorination started at a temperature of 58° C. Chlorination was continued for approximately 6½ hours with the temperature in the range of 100°–115° C. The solids present in the flask were melted, chilled to about 8° C., and then filtered. A solid and a liquid product resulted which assayed, respectively, 92.5% and 77.8% trichloromethylphosphonic dichloride. The over-all yield of product was 72.6%.

Example III

An experiment similar to Example II was performed, but arsenic trichloride and white light were used as the catalysts. Chlorination took approximately 5 hours and 45 minutes at a temperature of 105°–119° C. The yield based on analysis was 55% of trichloromethylphosphonic dichloride.

Example IV

An experiment similar to Example II was performed but phenylphosphonous dichloride and white light were used as the catalysts. Chlorination took approximately 7 hours and 15 minutes at a temperature of 113°–121° C. The yield of trichloromethylphosphonic dichloride was 76.2%.

Example V

Following a procedure similar to Example I an experiment was run in which trichloromethylphosphonic acid and white light were used as the catalysts. The chlorination required 8½ hours at a temperature of 114°–142° C. The total yield based on analytical data was 92.8% trichloromethylphosphonic dichloride.

Example VI

Following a procedure similar to Example I monochloromethylphosphonic acid and white light were used as catalysts. Chlorination required 10½ hours at 111°–116° C. The product yield was 86.4%.

Example VII

An experiment similar to Example I was run using trifluoroacetic acid and white light as catalysts. Chlorination required 8⅓ hours at a temperature of 105°–150° C. Total product yield based on analysis was 70.25% of trichloromethylphosphonic dichloride.

Example VIII 231.1 gms. of unrefined $ClCH_2POCl_2$ were placed in a quartz flask equipped with a thermometer, Barrett trap, and a reflux condenser connected to a Dry Ice acetone trap and gas entrance tube. Chlorine gas was then added at a rate of approximately 1¼ moles per hour. Ultraviolet light was supplied by a General Electric ultraviolet sunlamp. The temperature rose slowly to 150° C., and chlorination in the temperature range of 147°–152° C., was continued for a total of approximately nine hours until solid formation in the condenser became too excessive. The product, melted into a distillation flask, weighed 295.7 gms. (90.4%). This product was distilled at atmospheric pressure, and the product distilling at a vapor temperature of 200°–205° C., primarily 204°–205° C., was collected. This product analyzed 13.1% P, 74.9% Cl.

Example IX 231.1 gms. of $ClCH_2POCl_2$ and 500 ml. of $CCl_4$ were placed in a one liter Pyrex distillation flask equipped as in Example VIII. Chlorine was introduced as in Example VIII and the same ultraviolet light source was used. The temperature rose to 77° C., at which time refluxing began. Chlorination was continued for approximately five hours. The $CCl_4$ was then substantially stripped from the product which weighed 345.2 gms. (>100%). The product was then distilled collecting the fraction distilling at a vapor temperature from 202° to 211° C. This fraction weighed 298.9 gms. (91.4%) and analyzed 13.2% P, 73.5% Cl.

Example X

Using the same equipment and following the same procedure as in Example IX, 231.1 gms. of $ClCH_2POCl_2$ and 500 ml. of $CCl_4$ were added to the flask. Chlorine was added at reflux temperature of 70°–74° C. over a period of approximately five hours. The solution was then cooled to 30° C. and added rapidly dropwise to a liter of water (initial temperature, 27° C.) The temperature rose slowly to 30° C. during the addition and no cooling water was needed. The mixture of liquids was placed in a distillation apparatus and the $CCl_4$ removed at atmospheric pressure until 100° C. liquid temperature was reached. The water solution of trichloromethylphosphonic acid was then filtered through a sintered glass funnel for clarification. The solution was placed in a weighed two-liter beaker and the water removed to a product temperature of 115° C. The product was allowed to crystallize and gave 330.3 gms. of monohydrate crystals. A 50 gm. portion of these crystals was dehydrated in a 100 ml. flask at an absolute pressure of 2 mm. of mercury at 90° C. for one hour and then at 120° C. for two hours. 42.1 gms. of anhydrous trichloromethylphosphonic acid resulted which is equivalent to 275 gms. (100%) of the original material. This material analyzed:

|  | Theory | Analysis |
| --- | --- | --- |
| Percent P | 15.5 | 15.4. |
| Percent Cl | 53.3 | 52.0. |
| Mol. Wt | 199.4 | 202.0. |
| Acid No | 100.3 | 98.8 ml. 0.1 N NaOH/gm. |
| Percent Water | Nil | <0.1. |

The process variables involved in this reaction are not extremely critical. Thus, the temperature may range from approximately 70° to 160° C., preferably 90° to 150° C., during chlorination. When a solvent such as $CCl_4$, or other chlorinated hydrocarbon solvents, are used, the reaction is conducted at the reflux temperature of the solvent. With the more strongly acidic catalysts such as trichloromethylphosphonic acid and trifluoroacetic acid, temperatures close to the melting point of the TCMPD (M.P.=155° C.) may be used. Temperatures near 125° C. are preferred with the weaker acids to retard decomposition.

In the absence of a solvent the reaction is generally continued until the reaction mixture has become solid or until the sublimation rate of the product has become excessive. Sublimation usually begins after about six hours and the rate then tends to increase. Total time required for chlorination is generally 4 to 10 hours.

Stirring the reaction mixture is an optional procedure. Agitation caused by chlorine addition or reflux action is generally satisfactory in the laboratory although stirring has been used. For commercial production stirring is desirable.

Trichloromethylphosphonic dichloride is a particularly valuable intermediate in the production of phosphorus containing organic compounds. It hydrolyzes to form trichloromethylphosphonic acid which is a valuable compound used in various lubricants. Such lubricants are described for instance in U.S. Patent 2,708,204.

The foregoing detailed description has been given for clearness of understanding only, and no unnecessary limitations should be understood therefrom, as modifications will be obvious to those skilled in the art.

We claim:

1. A process for producing trichloromethylphosphonic dichloride comprising chlorinating monochloromethylphosphonic dichloride in the presence of actinic light.

2. The process of claim 1 wherein chlorination is conducted at a temperature of 70° to 160° C.

3. The process of claim 1 wherein monochloromethylphosphonic dichloride is chlorinated in the presence of a chlorinated hydrocarbon solvent and at the reflux temperature of the solvent.

4. The process of claim 1 wherein the actinic light is ultraviolet light.

5. A process for producing trichloromethylphosphonic dichloride comprising chlorinating monochloromethylphosphonic dichloride in the presence of actinic light and a strong acid catalyst.

6. The process of claim 5 wherein the actinic light is ordinary white light.

7. The process of claim 6 wherein the acid catalyst is monochloromethylphosphonic acid.

8. The process of claim 6 wherein the acid catalyst is trifluoroacetic acid.

9. The process of claim 6 wherein the acid catalyst is trichloromethylphosphonic acid.

10. The process of claim 6 wherein the acid catalyst is phosphorus pentachloride.

11. The process of claim 6 wherein the acid catalyst is antimony trichloride.

References Cited in the file of this patent

UNITED STATES PATENTS

| | | |
|---|---|---|
| 2,446,430 | Norton | Aug. 3, 1946 |
| 2,811,485 | Evans | Oct. 29, 1957 |
| 2,834,804 | Lecher et al. | May 13, 1958 |

OTHER REFERENCES

Ellis et al.: Chemical Action of Ultraviolet Rays, page 526.